United States Patent
Schulz et al.

(10) Patent No.: US 12,553,351 B2
(45) Date of Patent: Feb. 17, 2026

(54) ENGINE COMPONENT WITH A COOLING SUPPLY CIRCUIT

(71) Applicant: GENERAL ELECTRIC COMPANY, Schenectady, NY (US)

(72) Inventors: Susan Emily Schulz, Colerain Township, OH (US); Zachary Daniel Webster, Liberty Township, OH (US); Daniel Endecott Osgood, Loveland, OH (US); Jorge Rodrigo Quintero Badillo, Loveland, OH (US); Catherine Marie Rucki, West Chester, OH (US); Ricardo Caraballo, Maineville, OH (US); David Lawrence Holzschuh, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/295,388

(22) Filed: Apr. 4, 2023

(65) Prior Publication Data
US 2024/0337190 A1    Oct. 10, 2024

(51) Int. Cl.
*F01D 5/18* (2006.01)
*F01D 5/14* (2006.01)

(52) U.S. Cl.
CPC .............. *F01D 5/188* (2013.01); *F01D 5/147* (2013.01); *F05D 2240/81* (2013.01); *F05D 2260/201* (2013.01)

(58) Field of Classification Search
CPC ...... F01D 5/147; F01D 5/188; F05D 2240/81; F05D 2260/201
See application file for complete search history.

(56) References Cited

U.S. PATENT DOCUMENTS

| | | | |
|---|---|---|---|
| 5,344,283 A | 9/1994 | Magowan et al. | |
| 6,092,991 A * | 7/2000 | Tomita | F01D 5/187 415/114 |
| 7,131,817 B2 * | 11/2006 | Keith | F01D 5/187 416/193 A |
| 7,416,391 B2 | 8/2008 | Veltre et al. | |
| 8,079,814 B1 * | 12/2011 | Liang | F01D 5/187 415/115 |
| 8,647,064 B2 * | 2/2014 | Boyer | F01D 5/187 416/193 A |
| 8,734,111 B2 | 5/2014 | Lomas et al. | |
| 8,840,369 B2 | 9/2014 | Ellis et al. | |
| 9,222,364 B2 | 12/2015 | Papple et al. | |
| 10,280,762 B2 | 5/2019 | Mongillo et al. | |

(Continued)

*Primary Examiner* — Nathaniel E Wiehe
*Assistant Examiner* — Aye S Htay
(74) *Attorney, Agent, or Firm* — Hanley, Flight & Zimmerman, LLC

(57) ABSTRACT

A turbine blade assembly for a turbine engine that generates a hot fluid flow and provides a cooling fluid flow. The turbine blade assembly having a platform with an upper wall radially spaced from a lower wall, and a platform wall connecting the upper wall to the lower wall to bound an interior of the platform. An airfoil extending from the upper wall and having an airfoil wall at least partially bounding an interior of the airfoil and defining a heated surface in contact with the hot fluid flow. At least one cooling supply conduit extending into the interior of the airfoil and multiple cores provided in the interior of the platform.

20 Claims, 6 Drawing Sheets

(56) References Cited

U.S. PATENT DOCUMENTS

| | | |
|---|---|---|
| 10,533,453 B2 | 1/2020 | Hough et al. |
| 10,633,977 B2 | 4/2020 | Takamura et al. |
| 2012/0034102 A1* | 2/2012 | Boyer .................... F01D 5/187 |
| | | 29/889.72 |
| 2014/0064984 A1 | 3/2014 | Zhang et al. |
| 2014/0338364 A1* | 11/2014 | Johns .................... F01D 5/084 |
| | | 416/96 R |

* cited by examiner

ENGINE COMPONENT WITH A COOLING SUPPLY CIRCUIT

TECHNICAL FIELD

This disclosure generally relates to an apparatus and method for cooling a component and more specifically to cooling an engine component with an airfoil and platform.

BACKGROUND

Turbine engines, and particularly gas or combustion turbine engines, are rotary engines that extract energy from a flow of combusted gases passing through the engine and flowing over a multitude of airfoils, including stationary vanes and rotating turbine blades.

Cooling of certain engine components, such as the high pressure turbine and the low pressure turbine, can be beneficial, because gas turbine engines for aircraft are designed to operate at high temperatures to maximize engine efficiency. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blade assemblies and other engine components generally include one or more interior cooling circuits for routing the cooling air through the engine component to cool different portions of the engine component, and can include dedicated cooling circuits for cooling different portions of the engine component.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
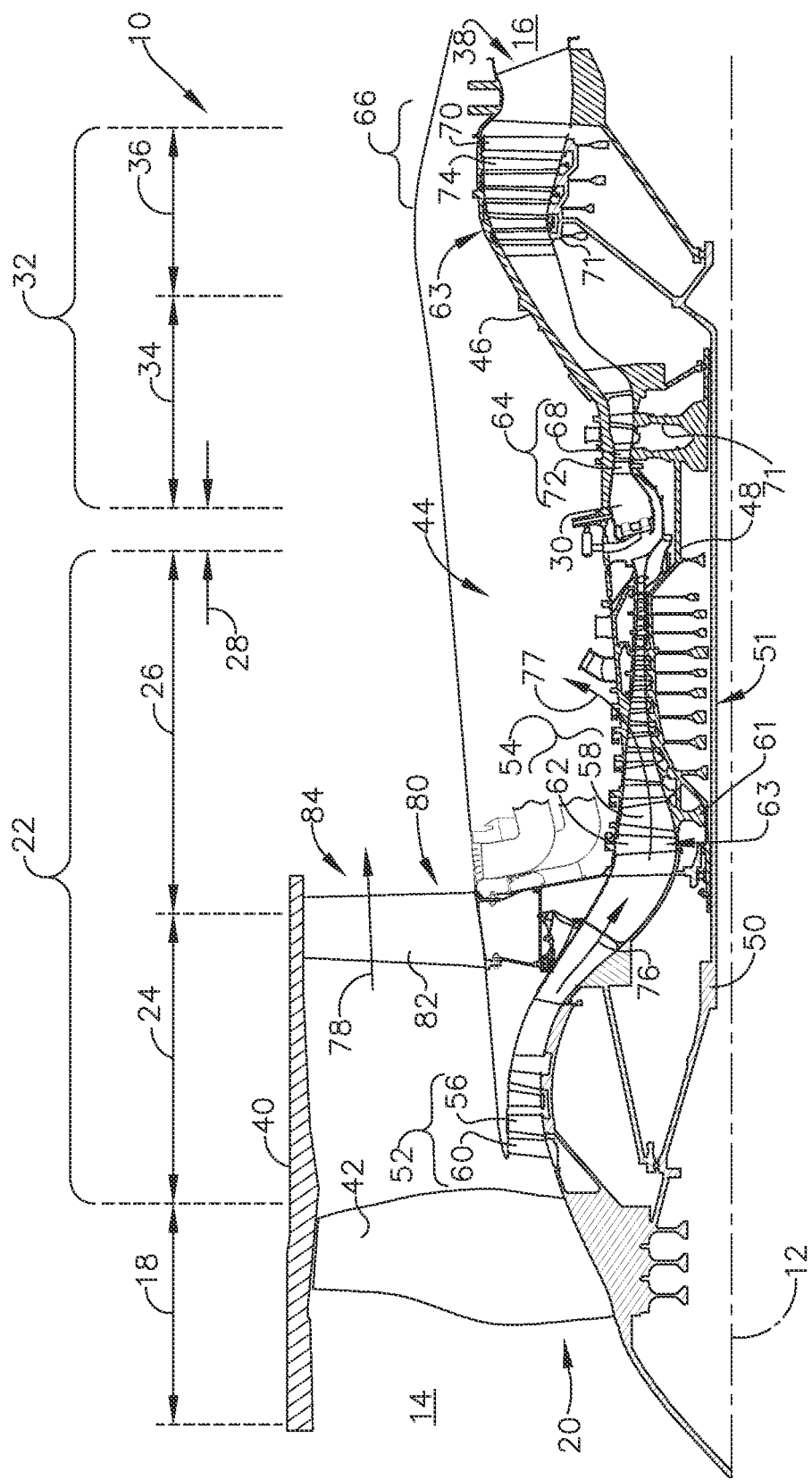
FIG. 1 is a schematic cross-sectional diagram of a gas turbine engine for an aircraft.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Aspects of the disclosure generally relate to an apparatus and method for cooling an engine component, and more particularly to multiple cores within a platform of a turbine airfoil assembly. For purposes of illustration, the present disclosure will be described with respect to a blade assembly. It will be understood, however, that aspects of the disclosure described herein are not so limited and may have general applicability within other engine components including vane assemblies and/or shroud assemblies.

Providing cores within a platform can be difficult. While platforms require cooling, providing cores within the platform can cause durability issues. It can be difficult to make a platform core that does not violate pull planes during the manufacturing process. Frequently a clamshell mold is used to form a core. When removing the core, pulling top and bottom shells of the clamshell apart requires a strong enough pull plane to ensure the resulting core does not split into pieces located in both the top and bottom shells. In addition, pull planes require that the cores have a linear axis in which the clamshell can be pulled apart, limiting the design such that no portion of the core is stuck in any portion of the mold. The pull planes add constraints to what the core can look like. Further, attaching a core to an interior cooling passage of an airfoil can also present difficulties. Multiple cores can also provide difficulties as movement relative to each other can occur during operation.

The disclosure herein provides solutions to the difficulties presented when forming and utilizing platform cores. A cored platform where two or more cores are separated within the platform by ribs provides an improvement operationally with respect to cooling and an improved durability to the airfoil assembly by providing stability and reducing mechanical stresses.

The word "exemplary" may be used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As may be used herein, the terms "first," "second," and "third" can be used interchangeably to distinguish one component from another and are not intended to signify location or importance of the individual components.

The singular forms "a", "an", and "the" include plural references unless the context clearly dictates otherwise.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34 and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by a core casing 46, which can be coupled with the fan casing 40.

A HP shaft or spool 48 disposed coaxially about the engine centerline 12 of the engine 10 drivingly connects the HP turbine 34 to the HP compressor 26. A LP shaft or spool 50, which is disposed coaxially about the engine centerline 12 of the engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The blades 56, 58 may be part of a blisk, rather than being mounted to a disk. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complimentary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering and exiting the combustor 30 is significantly increased. As such, cooling provided by the bleed air 77 is supplied to downstream turbine components (e.g., a blade 68) that are subjected to the heightened temperature environments.

A remaining portion of the airflow exiting the fan section (a bypass airflow 78) bypasses the LP compressor 24 and engine core 44 and exits the engine 10 through a stationary vane row. More particularly the stationary vane row is an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine 10 are normally downstream of the combustor 30, including the turbine section 32. The HP turbine 34 is generally one of the hottest portions of the engine 10 as it is directly downstream of the combustion section 28. Other sources of cooling fluid can be, but are not limited to, fluid discharged from the LP compressor 24 or the HP compressor 26.

Figure 2:
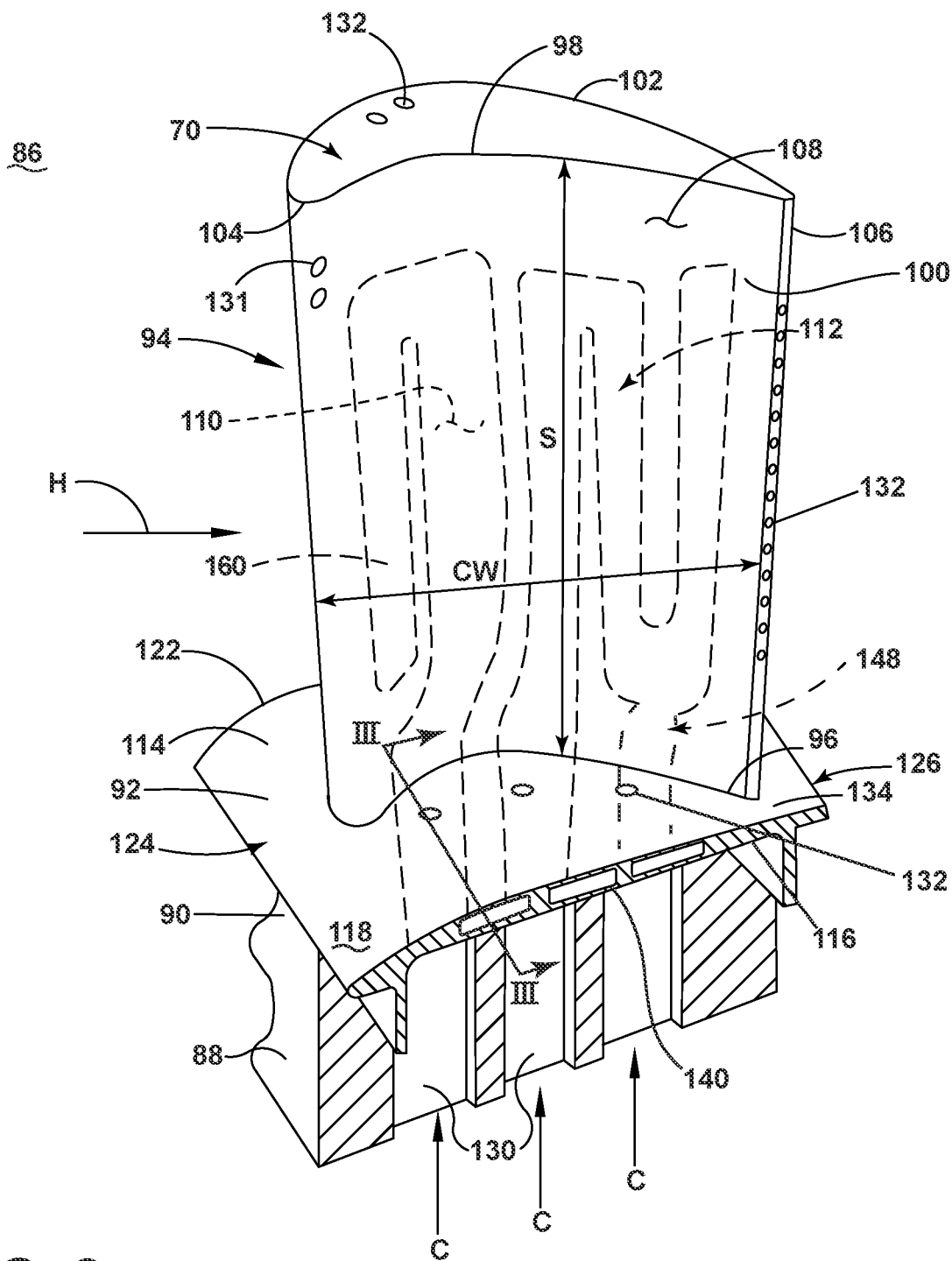
FIG. 2 is a perspective view of an engine component in the form of a turbine blade assembly with an airfoil, a platform, a shank, and a dovetail according to an aspect of the disclosure herein.

FIG. 2 is a perspective view of an engine component in the form of a turbine blade assembly 86 with a turbine blade 70 of the engine 10 from FIG. 1. Alternatively, the engine component can be a vane, a strut, a service tube, a shroud, or a combustion liner in non-limiting examples, or any other engine component that can require or utilize cooling passages.

The turbine blade assembly 86 includes a dovetail 88, a shank 90, a platform 92, and an airfoil 94. The airfoil 94 meets the platform 92 to define a root 96. The airfoil 94 extends between the root 96 and a tip 98 to define a span-wise direction (denoted "S"). When multiple airfoils are circumferentially arranged in side-by-side relationship, the platform 92 helps to radially contain the turbine engine mainstream air flow and forms the radially inner wall of an annulus through which the air flows. The dovetail 88 can be configured to mount to the turbine rotor disk 71 on the engine 10 from FIG. 1.

The airfoil 94 includes a first side 100, illustrated as a concave-shaped pressure side, and a second side 102, illustrated as a convex-shaped suction side. The first and second sides 100, 102 together define an airfoil cross-sectional shape of the airfoil 94. The airfoil 94 extends between an upstream edge 104, or a leading edge as illustrated, and a downstream edge 106, or a trailing edge as illustrated, to define a chord-wise direction (denoted "CW"). An outer periphery of the airfoil 94 is bound by an airfoil wall 108, which also defines the first and second sides 100, 102.

The platform 92 can be defined by a platform wall 118 including an upper wall 114 and a lower wall 116 radially spaced from each other. The platform wall 118 can define a pair of slashfaces 122 circumferentially spaced from each other and a platform leading edge 124 and a platform trailing edge 126 axially spaced from each other.

A set of platform cores 140 can be formed within the platform 92 and defined at least in part by the platform wall 118. It should be understood that the thickness of the platform wall 118 can vary depending on the location of the turbine blade assembly 86 in the engine 10.

At least one airfoil cooling hole 131 can be located along any portion of the airfoil wall 108 including along the upstream edge 104, the downstream edge 106, the tip 98 and anywhere else as needed.

The at least one platform cooling hole 132 can also be located in the upper wall 114 of the platform 92 and fluidly coupled to the set of platform cores 140. The at least one platform cooling hole 132 can pass through a substrate, which by way of illustration the upper wall 114 of the platform 92. The airfoil wall 108 and the upper wall 114 of the platform 92 can face a hot fluid flow (denoted "H") to define a heated surface 134. It should be understood, however, that the substrate can be any wall within the engine 10 including but not limited to interior walls, a tip wall, or a combustion liner wall.

The turbine blade assembly 86 can include a cooling supply circuit 160. The airfoil wall 108 can bound an interior 110 including at least one cooling supply conduit 112, illustrated in dashed line. The at least one cooling supply conduit 112 can extend radially from the interior 110 into the dovetail 88. A set of inlet passageways 130 can extend through the dovetail 88 and shank 90 to provide internal fluid communication with the at least one cooling supply conduit 112 and the set of platform cores 140. A cooling fluid flow (denoted "C") can be supplied to the set of inlet passageways 130 and passed along to the at least one cooling supply conduit 112 and to the set of platform cores 140.

A first set of passages 150 (FIG. 3) can fluidly couple the set of inlet passageways 130 to the set of platform cores 140. A second set of passages 148 can fluidly couple the set of inlet passageways 130 to the at least one cooling supply conduit 112. Together the passages 148, 150, at least one cooling supply conduit 112 and the set of platform 140 define the cooling supply circuit 160.

Materials used to form the substrate and the cooling architecture can include, but are not limited to, steel, refractory metals such as titanium, or superalloys based on nickel, cobalt, or iron, and ceramic matrix composites. The substrate and cooling architecture can be formed by a variety of methods, including additive manufacturing, casting, electroforming, or direct metal laser melting, in non-limiting examples.

Figure 3:
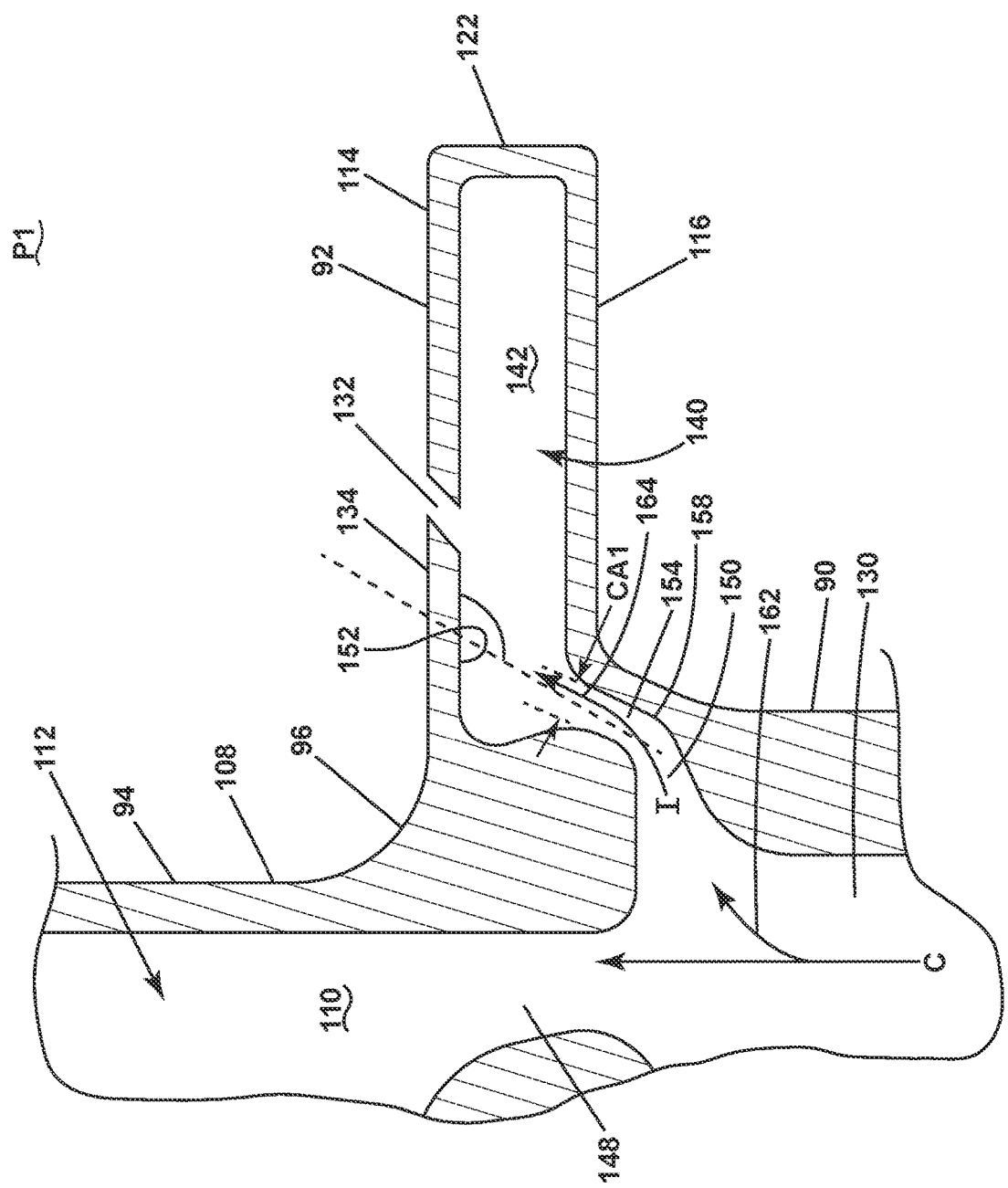
FIG. 3 is a cross-sectional view of the airfoil, platform, and shank from FIG. 2 taken along line III-III.

FIG. 3 is a cross-sectional view of the platform 92, and shank 90, taken along line III-III of FIG. 2 illustrating a first cross-sectional area CA1 of the first set of passages 150. The at least one platform cooling hole 132 can be provided on the upper wall 114 and fluidly coupled to a platform core 142 in the set of platform cores 140 to exhaust the cooling fluid flow C along the heated surface 134 of the platform 92. The first set of passages 150 can introduce the cooling fluid flow C to the set of platform cores 140 such that the cooling fluid flow C impinges on an inner surface 152 of the upper wall 114 to define an impinging fluid flow (denoted "I").

In one non-limiting example at least one passage 154 in the first set of passages 150 can be angled such that the impinging fluid flow impinges on the inner surface 152 at an impingement angle ($\theta$). The impingement angle can be between or equal to 30 and 150 degrees ($30° \leq \theta \leq 150°$).

It is further contemplated the cross-section of FIG. 3 is taken along a first plane P1 parallel to line III-III and that the at least one passage 154 is a curved passage 158 turning from a first direction 162 in the first plane P1 to a second direction 164 different than the first direction in the first plane P1. Alternatively, or additionally, the at least one passage 154 can introduce the cooling fluid flow C to the set of platform cores 140 at different radial locations along an extent of the platform core 142. In other words, the cooling fluid flow C does not need to directly impinge on the inner surface 152.

Figure 4:
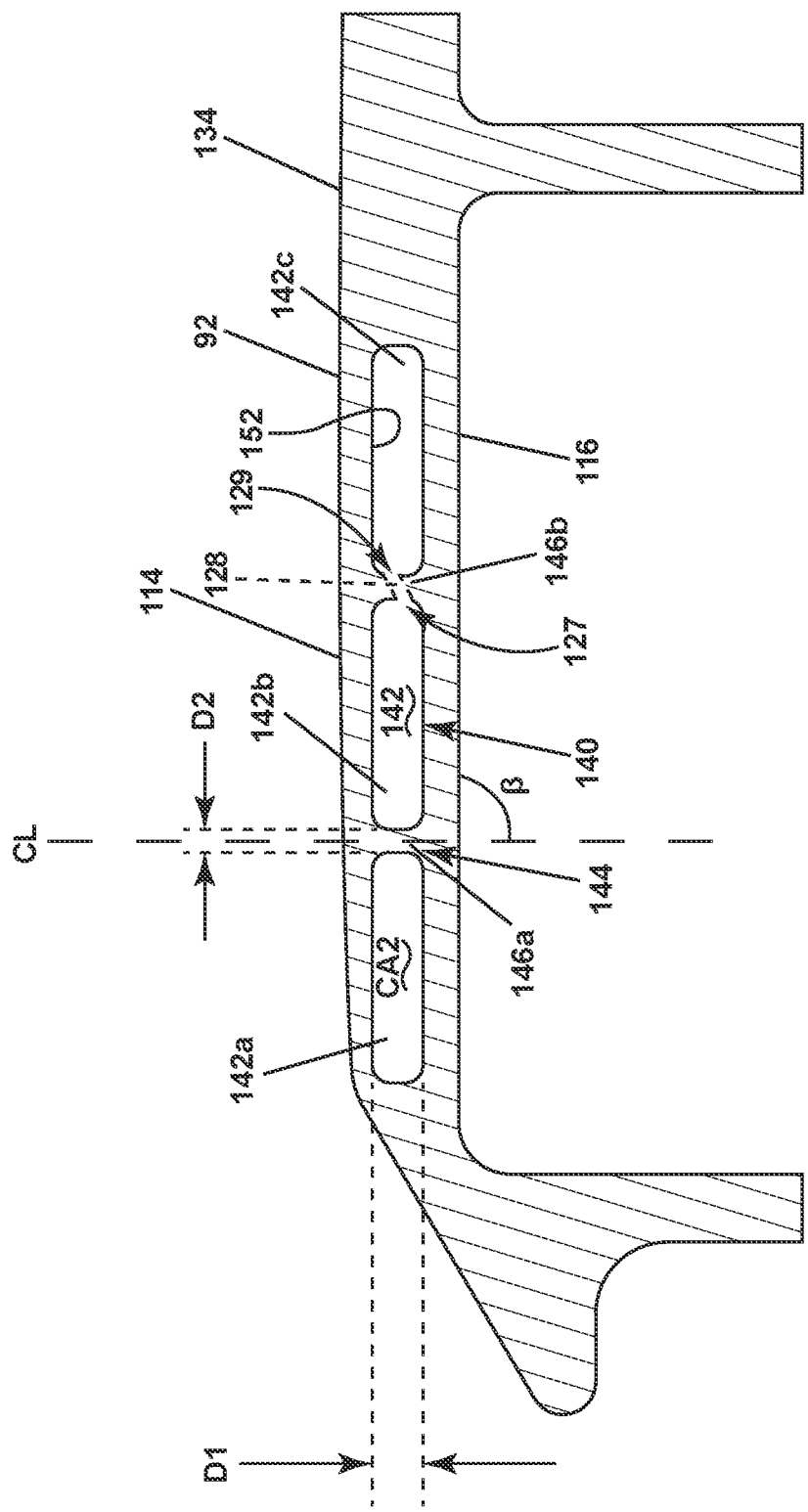
FIG. 4 is an enlarged cross-sectional view of the platform from FIG. 2 with a set of platform cores in the platform.

FIG. 4 is an enlarged cross-sectional view of the platform 92 from FIG. 2 illustrating a second cross-sectional area CA2 of the platform cores 142, in particular a first platform core 142a. The set of platform cores 140 can include three platform cores 142 (the first platform core 142a, a second platform core 142b, and a third platform core 142c) though any number of platform cores 142 is contemplated. By way of non-limiting example, the second cross-sectional area CA2 can be the same or similar for each of the three platform cores 142a, 142b, 142c.

A set of ribs 144 can separate the set of platform cores 140 into the individual platform cores 142. Each rib 146a, 146b in the set of ribs 144 can extend between the upper wall 114 and the lower wall 116. Each rib 146a, 146b has a height, or first dimension (denoted "D1"). Each rib 146a, 146b can have a thickness, or second dimension (denoted "D2"). A centerline (denoted "CL") of the rib 146a forms an angle ($\beta$) with the lower wall 116. While illustrated as 90° (e.g., the rib 146a, 146b is perpendicular to the lower wall 116), the angle ($\beta$) can range between or be equal to 30° and 150° degrees ($30° \leq \alpha \leq$) 150°. Further while illustrated as the centerline CL for the rib 146a, it should be understood that the same applies to the rib 146b.

At least one cross-over hole 128 can extend through the rib 146b between platform cores 142b, 142c. The at least one cross-over hole 128 forms an inlet 127 at the second platform core 142b and an outlet 129 at the third platform core 142c. The inlet 127 is radially spaced from the outlet 129 with the outlet 129 closer to the heated surface 134 than the inlet 127. The outlet 129 can be arranged such that the cooling fluid flow C impinges on the inner surface 152. Further while illustrated as passing through the rib 146b, it should be understood that the at least one cross-over hole 128 can pass through the rib 146a, or through both ribs 146a, 146b.

Figure 5:
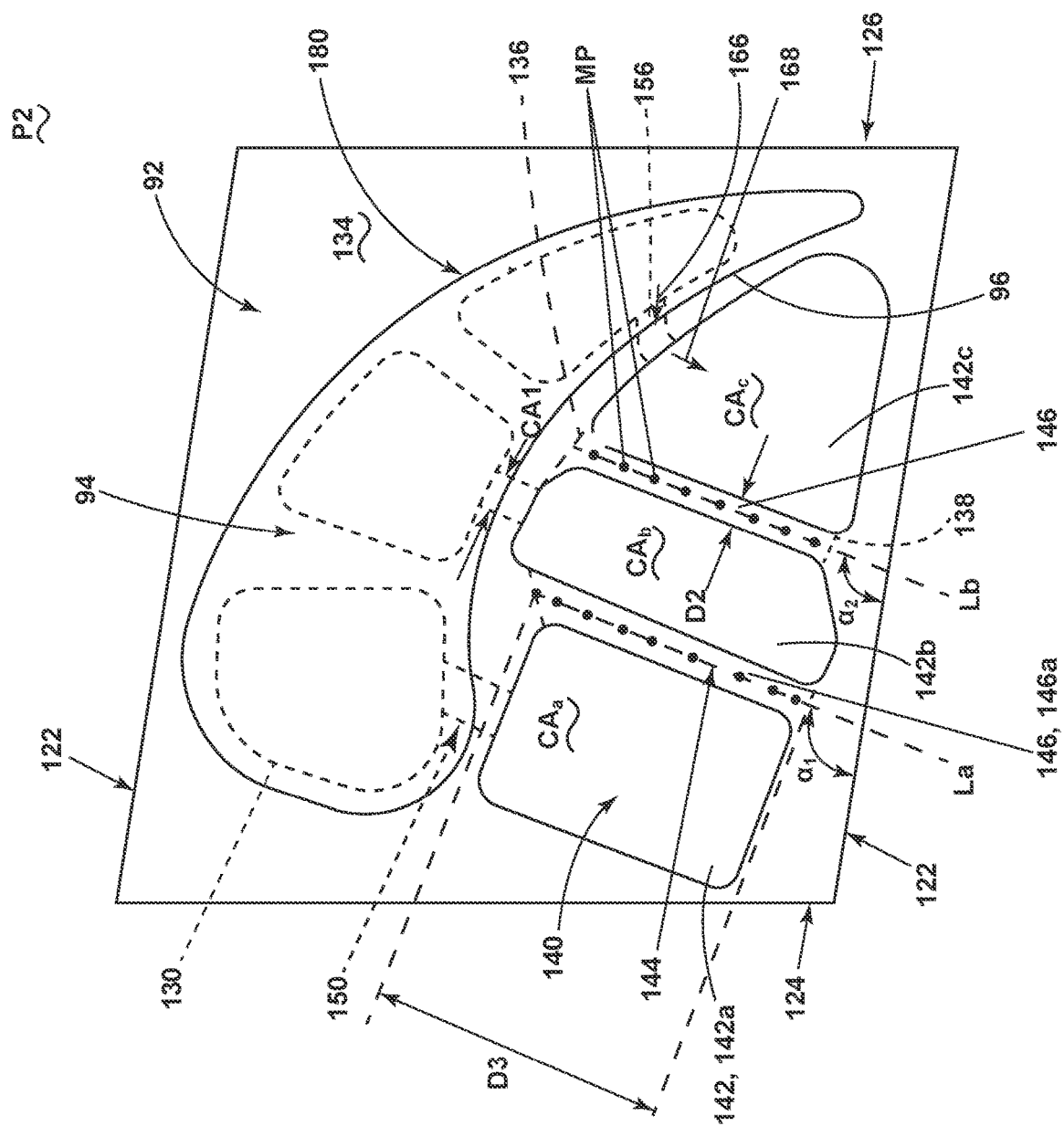
FIG. 5 is a top down schematic view of footprints associated with the airfoil and the set of platform cores from FIG. 3 according to an aspect of the disclosure herein.

Turning to FIG. 5, a top-down schematic view of footprints 180 associated with the airfoil 94 and set of platform cores 140 in the platform 92 is illustrated with the set of inlet passageways 130 illustrated in dashed line. This view illustrates a cross-sectional area $CA_a$ associated with the first platform cores 142a, a cross-sectional area $CA_b$ associated with the second platform core 142b, and a cross-sectional area $CA_c$ associated with the third platform core 142c.

Each rib 146a, 146b in the set of ribs 144 can extend from the airfoil 94 proximate the root 96 toward at least one of the pair of slashfaces 122. A set of midpoints (denoted "MP") is illustrated at a middle of the second dimension D2 along a length, or third dimension (denoted "D3") of each rib 146a, 146b. A line of best fit (denoted "La" and "Lb") for the set of midpoints MP extends through the set of midpoints. The third dimension D3 is measured along the line of best fit L from one end 136 of each rib 146a, 146b, proximate the airfoil 194, to another end 138 of the same rib 146a, 146b, proximate one of the pair of slashfaces 122. The third dimension D3 can differ for each rib 146a. 146b. Each rib 146a, 146b can be continuous such that the line of best fit L intersects the airfoil 94 and a slashface of the pair of slashfaces 122. It is also contemplated that each rib 146a, 146b is bordered on both sides by a first platform core 142a and a second platform core 142b.

The line of best fit La, Lb forms a rib angle ($\alpha$) with one of the pair of slashfaces 122. The rib angle ($\alpha$) can be open to the platform leading edge 124 in one non-limiting example. The angle ($\alpha$) can range between or be equal to 30° and 150° degrees ($30° \leq \alpha \leq 150°$). In another aspect the rib angle can range between or equal to 60° and 80° ($60° \leq \alpha \leq 80°$) and between or equal to 100 and 130° degrees ($100° \leq \alpha \leq 130°$). The rib angle ($\alpha$) can be multiple angles $\alpha_1$, $\alpha_2$ associated with each rib 146a, 146b where the multiple angles $\alpha_1$, $\alpha_2$ are different from each other ($\alpha_1 \neq \alpha_2$). The angle ranges enable a balance of stress requirements with a direction of cooling flow and with cooling requirements of the platform, in other words, the angle ranges enable tuning different parts of the platform for the environment in which that part is located. It is further contemplated that the multiple angles are equal to each other ($\alpha_1 = \alpha_2$).

At least one passage 156 in the first set of passages 150 can be non-linear in two planes. In other words, FIG. 5 is a top down view of the platform 92 within a second plane P2. The at least one passage 156 can be the curved passage 158 of FIG. 3 and additionally turn from a third direction 166 in the second plane P2 to a fourth direction 168 in the second plane P2 different than the third direction 166.

A minimum of the cross-sectional area CA1 of the first set of passages 150 can be different than a minimum of either cross-sectional area CA2 or the other orientation described above, of cross-sectional area $CA_a$, $CA_b$, $CA_c$ associated with each core 142.

A volume of rib material (denoted "$V_r$") of each rib 146a, 146b, by way of non-limiting example V=D1×D2×D3, is greater than 0 cm³. The volume of rib material $V_r$ can be a thermally conductive material, such as metal or a ceramic matrix composite, for transferring heat between the upper wall 114 and the lower wall 116. The entire platform 92, including the pair of slashfaces 122, the platform wall 118 including the upper wall 114 and the lower wall 116, and the set of ribs 144 are formed from the same material and form a singular piece having a volume referred to herein as a total platform material volume (denoted "$V_p$"). In other words, the platform 92 and the set of ribs 144 are monolithic. The volume of rib material $V_r$ is greater than 0% of the total platform material volume $V_p$ and less than or equal to 30% of the total platform material volume $V_p$. In other words $V_r/V_p$ is greater than 0 and less than or equal to 0.30. In some implementations, benefits regarding cooling and stress/strain tuning along with maximizing efficiency result from in a range of $V_r/V_p$ being equal to 0.05 to 0.20, or between 5% and 20%, inclusive of endpoints. The set of ribs 144 are act as a cold wall, allowing heat to freely transfer between the upper wall 114 and the lower wall 116. This enables a balanced overall material temperature, rather than a temperature differentiation causing a thermal discrepancy.

Figure 6:
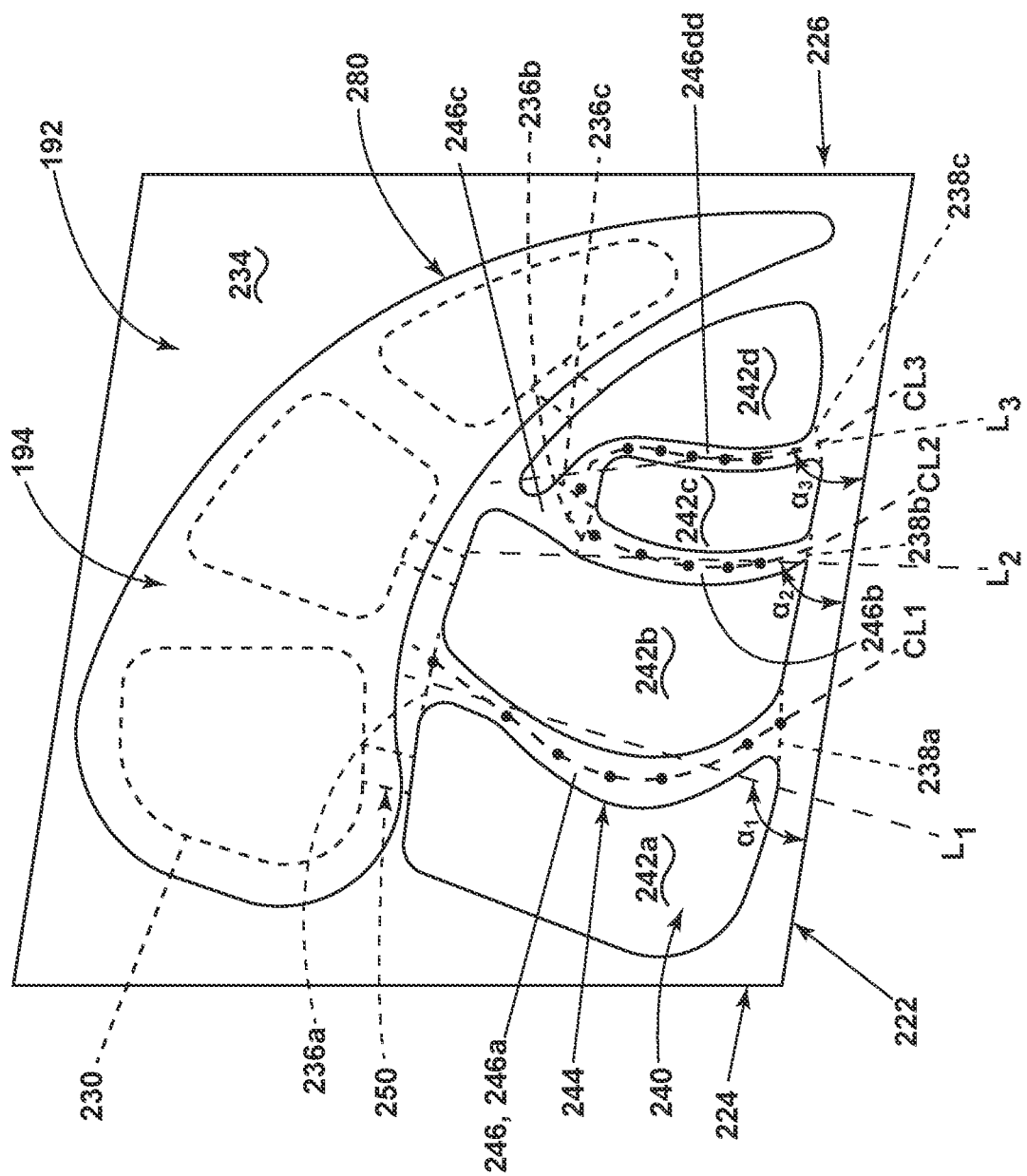
FIG. 6 is a top down schematic view of a variation of footprints associated with the airfoil and the set of platform cores from FIG. 3 according to another aspect of the disclosure herein.

Turning to FIG. 6, a top down schematic view of footprints 280 according to another aspect of the disclosure herein. The footprints 280 are similar to the footprints 180; therefore, like parts will be identified with like numerals increased by 100, with it being understood that the description of the like parts of the footprints 180 applies to the footprints 280, except where noted.

An airfoil 194 and a set of platform cores 240 in a platform 192 is illustrated with a set of inlet passageways 230 in dashed line. A set of ribs 244 can extend from the airfoil 194 proximate toward at least one of a pair of slashfaces 222. The set of ribs 244 can include a first, or curved rib 246a, a second, or connector rib 246b, a third, or short rib 246c, and a fourth, or irregular rib 246d. The curved rib 246a can have a curved centerline (denoted "CL1"). The curved rib 246a can extend between a first end 236a and a second end 238a such that the first end 236a faces the airfoil 194 and the second end 238a faces one of the pair of slashfaces 222.

The connector rib 246b is only partially surrounded by a second platform core 242b and a third platform core 242c. The short rib 246c extends to the airfoil 194 from the connector rib 246b. The connector rib 246b can have a shorter centerline (denoted "CL2") than the curved centerline CL1. The connector rib 246b is connected to both the short rib 246c and the irregular rib 246d.

Further the irregular rib 246d can extend between a first end 236c and a second end 238c such that the first end substantially faces the platform leading edge 224, while the second end 238c faces one of the pair of slashfaces 222. In other words, the irregular rib 246d is different than the curved rib 246a in that at least one of the corresponding ends 236c. 238c faces either the platform leading edge 224 or the platform trailing edge 226. The irregular rib 246d can have an irregular centerline (denoted "CL3").

Lines of best fit L1, L2, L3 corresponding with the curved rib 246a, the short rib 246b, and the irregular rib 246d extend through a set of midpoints MP associated with the corresponding rib as previously described herein. While any of the curved centerline CL1, the short centerline CL2, or the irregular centerline CL3 can have a curvilinear portion, it should be understood that the line of best fit L1 is straight and intersects the airfoil 294 and one of the pair of slashfaces 222. Further, each of the lines of best fit L1, L2, L3 form a corresponding first angle ($\alpha_1$), a second angle ($\alpha_2$), and a third angle ($\alpha_3$), with one of the pair of slashfaces 222 as previously described herein. It is contemplated that the angles α1, α2, α3 associated with each rib 246a, 246b, 246d are different from each other ($\alpha_1 \neq \alpha_2 \neq \alpha_3$). The angle ranges described herein allow for a bending of each rib 146a. 146b while still providing sufficient support. It is further contemplated that the multiple angles are equal to each other ($\alpha_1 = \alpha_2 = \alpha_3$).

Benefits associated the individual platform cores described herein allow for customization of the size and the shape of each individual platform core in the set of platform cores. For example, the first platform core can be customized with regards to the stresses and temperatures of the airfoil in the leading edge region. The individual ribs allow conduction up to the platform surface, which has a positive cooling influence. The ribs described herein are more versatile with regards to placement in the platform to better cool the platform and airfoil. The rib placement herein is provided in a typically difficult location regarding durability in order to reduce stresses of the platform. The ribs hold the platform down while the angles can be changed to best tune the thermal and structural benefits. By forming the platform out of a singular piece, there are also manufacturing savings as less parts are needed. Further, traditionally utilizing plates that are brazed to the platform cause stress and strain as the material is different and therefore thermally affected differently by the environment.

Additionally, the impingement described herein is very impactful as a cooling solution, so having multiple impingement regions is beneficial for cooling. There are no limitations on which inlet passageways cooling fluid is pulled from, this allows for tailoring an amount of cooling to the cavity. Further the multi-core design enables cooling film to come from multiple cavities. Each platform core can be tailored in terms of size and orientation depending on how much film is needed in each region on the external platform surface. This is a benefit over having one core fed from one inlet passageway which limits the design to the constraints of that single core circuit.

It should be understood that any combination of the geometry related to the set of platform cores discussed herein is contemplated. The varying aspects of the disclosure discussed herein are for illustrative purposes and not meant to be limiting. It should be appreciated that application of the disclosed design can be for any applicable components, including any component in need of coating and masking.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine blade assembly for a turbine engine that generates a hot fluid flow and provides a cooling fluid flow, the turbine blade assembly comprising a platform having an upper wall radially spaced from a lower wall, and a platform wall connecting the upper wall to the lower wall; an airfoil extending from the upper wall and having an airfoil wall at least partially bounding an interior of the airfoil and defining a heated surface in contact with the hot fluid flow; at least one cooling supply conduit provided in the interior of the airfoil; and a set of platform cores formed within the platform, with at least one rib, extending between the upper and lower walls, separating the set of platform cores into multiple platform cores, with at least one of the multiple platform cores fluidly coupled to the cooling supply conduit to define a cooling supply circuit through which the cooling fluid flow can flow.

The turbine blade assembly of any preceding wherein the peripheral sidewall comprises axially spaced leading and trailing edges, and a pair of slashfaces circumferentially spaced from each other.

The turbine blade assembly of any preceding claim wherein the at least one rib extends from one of the pair of slashfaces a length, and extends radially from the heated surface to an inner surface a height, and together the thickness, length, and height define a volume of rib material, wherein the volume of rib material is greater than 0% and less than or equal to 30% of a volume of total platform material.

The turbine blade assembly of any preceding claim wherein the volume of rib material is between 5% and 20%, inclusive of endpoints.

The turbine blade assembly of any preceding clause wherein a set of midpoints for the volume of material define a line of best fit where the line intersects with one of the pair of slashfaces to define a rib angle that is greater than or equal to 30° and less than or equal to 150°.

The turbine blade assembly of any preceding clause wherein the rib angle is between or equal to 60° and 80°.

The turbine blade assembly of any preceding clause wherein the rib angle is between or equal to 100 and 130° degrees.

The turbine blade assembly of any preceding clause wherein the at least one rib is a curved rib and the set of midpoints define a curved centerline.

The turbine blade assembly of any preceding clause wherein the at least one rib is multiple ribs and the rib angle corresponding with each of the multiple ribs is different from each other.

The turbine blade assembly of any preceding clause further comprising at least one cross-over hole fluidly coupling at least two of the multiple cores.

The turbine blade assembly of any preceding clause further comprising a first set of passages fluidly coupling the at least one cooling supply conduit to the set of platform cores.

The turbine blade assembly of any preceding clause wherein the first set of passages comprises at least one passage oriented at an angle such that the cooling fluid flow impinges on an inner surface of a platform core in the set of platform cores.

The turbine blade assembly of any preceding clause wherein the at least one passage is a curved passage.

The turbine blade assembly of any preceding clause wherein each of the multiple platform cores defines a different cross-sectional area.

The turbine blade assembly of any preceding clause further comprising a shank extending radially inward from the platform and comprising a set of inlet passages, the set of inlet passages in fluid communication with at least one of the multiple cores to further define the cooling supply circuit.

The turbine blade assembly of any preceding clause wherein the set of inlet passages is multiple inlet passages.

The turbine blade assembly of any preceding clause each of the multiple inlet passages is in fluid communication with a distinct platform core via a first set of passages.

The turbine blade assembly of any preceding clause wherein a cross-sectional area of the set of inlet passages is different than a cross-sectional area of the first set of passages taken along the same plane.

The turbine blade assembly of any preceding clause further comprising at least one cooling hole fluidly coupled to the cooling supply circuit and located on one of the airfoil or the platform.

The turbine blade assembly of any preceding clause wherein the at least one cooling hole is multiple cooling holes, each in fluid communication with each of the multiple platform cores.

The turbine blade assembly of any preceding clause wherein the at least one cross-over hole forms an inlet at one of the cores and an outlet at another of the cores.

The turbine blade assembly of any preceding clause wherein the inlet is radially spaced from the outlet.

The turbine blade assembly of any preceding clause wherein the outlet is closer to the heated surface than the inlet.

The turbine blade assembly of any preceding clause wherein the outlet is arranged such that the cooling fluid flow impinges on an inner surface of the upper wall.

What is claimed is:

1. A turbine blade assembly for a turbine engine that generates a hot fluid flow and provides a cooling fluid flow, the turbine blade assembly comprising:
   a platform including a first platform core and a second platform core, the first and second platform cores at least partially defined by an upper wall of the platform, a lower wall of the platform radially spaced from the upper wall, a first rib, and a first slashface of the platform;
   an airfoil extending from a root at the platform, the airfoil comprising a heated surface in contact with the hot fluid flow;
   a cooling supply conduit extending into the airfoil;
   the first rib extending from the upper wall to the lower wall, the first rib separating the first platform core from the second platform core; and
   a first passage fluidly coupling at least one of the first platform core or the second platform core to the cooling supply conduit to define a cooling supply circuit through which the cooling fluid flow can flow;
   wherein the first passage is angled toward the upper wall to form an impinging fluid flow from at least a portion of the cooling fluid flow upon the upper wall.

2. The turbine blade assembly of claim 1, further comprising a second rib extending from the upper wall to the lower wall;
   wherein the platform comprises a leading edge axially spaced from a trailing edge, the platform comprises a pair of slashfaces including the first slashface and a second slashface circumferentially spaced from each other, the first rib is proximate the leading edge and the second rib is proximate the trailing edge;
   wherein the first rib is longer than the second rib in a direction perpendicular to a radial direction; and
   wherein the first rib and the second rib extend from the first slashface.

3. The turbine blade assembly of claim 2 wherein the first rib extends from the first slashface a length, extends radially from the upper wall to the lower wall a height, and includes a thickness, wherein together the thickness, the length, and the height define a volume of rib material, wherein the volume of rib material is greater than 0% and less than or equal to 30% of a volume of total platform material.

4. The turbine blade assembly of claim 3 wherein the volume of rib material is between 5% and 20%, inclusive of endpoints.

5. The turbine blade assembly of claim 4 wherein a set of midpoints for the volume of rib material define a line of best fit along the length of the first rib where the line intersects with the first slashface define a rib angle that is greater than or equal to 30° and less than or equal to 150°.

6. The turbine blade assembly of claim 5 wherein the rib angle is between or equal to 60° and 80°.

7. The turbine blade assembly of claim 5 wherein the rib angle is between or equal to 100° and 130° degrees.

8. The turbine blade assembly of claim 6 wherein the first rib is a curved rib and the set of midpoints define a curved centerline.

9. The turbine blade assembly of claim 6 wherein the rib angle corresponding with the first rib is different from a rib angle of the second rib.

10. The turbine blade assembly of claim 1 further comprising a cross-over hole fluidly coupling the first platform core and the second platform core, the cross-over hole angled to form a second impinging fluid flow on an inner surface of the upper wall.

11. The turbine blade assembly of claim 1 wherein the first passage is a curved passage turning from a first direction to a second direction that is different than the first direction.

12. The turbine blade assembly of claim 1 wherein each of the first platform core and the second platform core defines a different cross-sectional area.

13. The turbine blade assembly of claim 1 further comprising:
   a cross-over hole fluidly coupling the first platform core and the second platform core; and
   a shank extending radially inward from the platform and comprising a set of inlet passageways, the set of inlet passageways in fluid communication with at least one of the first platform core or the second platform core to further define the cooling supply circuit.

14. The turbine blade assembly of claim 13 wherein the set of inlet passageways includes a first inlet passageway and a second inlet passageway.

15. The turbine blade assembly of claim 14 wherein the first inlet passageway and the second inlet passageway are fluidly coupled with the first platform core and the second platform core, respectively, via the first passage and a second passage.

16. The turbine blade assembly of claim 15 wherein a cross-sectional area of the set of inlet passageways is different than a cross-sectional area of the first passage and the second passage taken along the same plane.

17. The turbine blade assembly of claim 1 further comprising a cooling hole fluidly coupled to the cooling supply circuit and located on an outer surface of one of the airfoil or the upper wall of the platform to exhaust at least some of the cooling fluid flow from the turbine blade assembly.

18. The turbine blade assembly of claim 17 wherein the cooling hole is in fluid communication with one of the first platform core or the second platform core.

19. A turbine blade assembly for a turbine engine that generates a hot fluid flow and provides a cooling fluid flow, the turbine blade assembly comprising:
   a platform including a first platform core and a second platform core, the first and second platform cores at least partially defined by an upper wall of the platform, a lower wall of the platform radially spaced from the upper wall, a first rib, and a first slashface of the platform;
   an airfoil extending from a root at the platform, the airfoil comprising a heated surface in contact with the hot fluid flow;
   a cooling supply conduit extending into the airfoil;
   the first rib extending from the upper wall to the lower wall, the first rib separating the first and second platform cores, with at least one of the first platform core or the second platform core fluidly coupled to the cooling supply conduit to define a cooling supply circuit through which the cooling fluid flow can flow;

wherein the platform comprises axially spaced leading and trailing edges, the first slashface and a second slashface circumferentially spaced from the first slashface;

wherein the first rib extends from the first slashface a length, extends radially from the upper wall to the lower wall to define a height, and includes a thickness, wherein together the thickness, the length, and the height define a volume of rib material; and wherein a set of midpoints for the volume of rib material define a line of best fit extending along the length toward the airfoil where the line of best fit intersects with one of the first slashface or the second slashface to define a rib angle that is greater than or equal to 30° and less than or equal to 150°.

20. The turbine blade assembly of claim 1 further comprising:

a shank extending from the platform;

a dovetail extending from the shank; and a first inlet passageway and a second inlet passageway extending at least partially through the dovetail and the shank;

wherein the first inlet passageway is in fluid communication with the first platform core; and wherein the second inlet passageway is in fluid communication with the second platform core.

* * * * *